United States Patent
Ediger et al.

(10) Patent No.: US 11,639,103 B2
(45) Date of Patent: May 2, 2023

(54) VEHICLE SPEED CONTROL IN A CURVE

(71) Applicant: Ford Global Technologies, LLC, Dearborn, MI (US)

(72) Inventors: Andreas Ediger, Cologne/NRW (DE); Franziskus Bauer, Huerth/NRW (DE); Harald Koerfgen, Hürth/NRW (DE); Katharina Ziegler, Pulheim/NRW (DE); Lukas Schrumpf, Solingen/NRW (DE); Alina Dahms, Solingen/NRW (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 120 days.

(21) Appl. No.: 17/201,426

(22) Filed: Mar. 15, 2021

(65) Prior Publication Data

US 2021/0291651 A1 Sep. 23, 2021

(30) Foreign Application Priority Data

Mar. 23, 2020 (DE) .......................... 102020107880.3

(51) Int. Cl.
*B60K 31/00* (2006.01)
*B60W 30/14* (2006.01)

(52) U.S. Cl.
CPC ....... *B60K 31/0066* (2013.01); *B60W 30/143* (2013.01); *B60W 2520/14* (2013.01); *B60W 2540/18* (2013.01); *B60W 2552/05* (2020.02); *B60W 2552/30* (2020.02); *B60W 2720/106* (2013.01); *B60W 2720/125* (2013.01)

(58) Field of Classification Search
CPC ......... B60W 2540/18; B60W 2520/14; B60W 30/143; B60W 30/18145; B60W 2556/50; B60W 2552/05; B60W 2552/30; B60W 2720/10; B60W 2720/106; B60W 2720/125; B60K 31/0066
USPC .......................................................... 701/93
See application file for complete search history.

(56) References Cited

U.S. PATENT DOCUMENTS

| | | | |
|---|---|---|---|
| 9,081,651 B2* | 7/2015 | Filev ...................... | B60K 31/00 |
| 2009/0037064 A1* | 2/2009 | Nakamura ........... | B60W 40/112 |
| | | | 701/70 |
| 2011/0066325 A1* | 3/2011 | Lu ........................ | B60W 10/184 |
| | | | 701/42 |
| 2011/0098922 A1* | 4/2011 | Ibrahim ................ | B60W 40/08 |
| | | | 701/532 |

(Continued)

FOREIGN PATENT DOCUMENTS

| | | | |
|---|---|---|---|
| CN | 111845740 A | * 10/2020 | .......... B60W 40/114 |
| DE | 102007036417 A1 | 2/2009 | |

(Continued)

OTHER PUBLICATIONS

DE Search Report dated Nov. 30, 2020 re Appl. No. 10 2020 107 880.3.

*Primary Examiner* — Atul Trivedi
(74) *Attorney, Agent, or Firm* — Frank A. MacKenzie; Bejin Bieneman PLC

(57) ABSTRACT

Controlling the speed of a motor vehicle with an adaptive cruise control system in a curve can include dynamically adjusting the speed of the motor vehicle depending on the planned exit from the roundabout and the current position of the motor vehicle.

16 Claims, 4 Drawing Sheets

(56) References Cited

U.S. PATENT DOCUMENTS

| | | | |
|---|---|---|---|
| 2011/0270466 A1* | 11/2011 | Nakadori | B60W 40/076 |
| | | | 701/1 |
| 2018/0284264 A1* | 10/2018 | Chambers | G08G 1/096791 |
| 2019/0107403 A1* | 4/2019 | Takeuchi | G01C 21/3617 |
| 2019/0291728 A1* | 9/2019 | Shalev-Shwartz | B60T 7/22 |
| 2020/0017124 A1* | 1/2020 | Camhi | G06N 20/00 |
| 2020/0307641 A1* | 10/2020 | Oyama | G05D 1/0061 |
| 2021/0110484 A1* | 4/2021 | Shalev-Shwartz | B60W 10/18 |

FOREIGN PATENT DOCUMENTS

| | | | | |
|---|---|---|---|---|
| DE | 102012213933 A1 | | 2/2014 | |
| DE | 102015226840 A1 | | 5/2017 | |
| DE | 102018207807 A1 | | 11/2019 | |
| FR | 3102443 A1 | * | 4/2021 | ............ B60W 30/14 |
| FR | 3105960 A1 | * | 7/2021 | ............ B60W 30/14 |
| IL | 267857 A | * | 7/2018 | ............ B60W 30/09 |
| IL | 267857 A | * | 8/2019 | ............ B60W 30/09 |
| WO | WO-2018115963 A2 | * | 6/2018 | ............ B60W 10/04 |
| WO | WO-2020065524 A1 | * | 4/2020 | ........ B60R 16/0239 |
| WO | WO-2020065525 A1 | * | 4/2020 | ............ B60W 30/09 |
| WO | WO-2020065527 A1 | * | 4/2020 | ........ B60R 16/0231 |
| WO | WO-2021040143 A1 | * | 3/2021 | ...... B60W 30/18163 |

\* cited by examiner

VEHICLE SPEED CONTROL IN A CURVE

CROSS-REFERENCE TO RELATED APPLICATION

This patent application claims priority to German Application No. DE 102020107880.3 filed on Mar. 23, 2020, which is hereby incorporated by reference in its entirety.

BACKGROUND

Adaptive cruise control (ACC) systems are known which automatically regulate the speed of an engine in such a way that the vehicle adheres to a speed specified by the driver as far as possible. Many vehicles often have a driving assistance system to help the driver to comply with the current speed limit on the currently busy road section, namely so-called intelligent speed assistance or an intelligent speed control system (intelligent adaptive cruise control, IACC). The IACC reacts to other vehicles and road signs in order to adjust the speed of the motor vehicle concerned.

Automatically adjusting speed is not simple in cornering, especially at roundabouts. The IACC must control the speed of the motor vehicle depending on the planned exit, recognize where the vehicle is and that it is really turning off. DE 10 2012 213 933 A1 describes a method of speed control before, during and after cornering. DE 10 2015 226 840 A1 describes a method for driving through a roundabout with which the speed is kept substantially constant between entering and exiting the roundabout. The object is to dynamically control the speed of a motor vehicle in a curve.

SUMMARY

The present disclosure includes a system and method for controlling the speed of a motor vehicle with an adaptive cruise control system in a curve and a motor vehicle for carrying out the method. The exemplary embodiments described herein can be combined with each other in an advantageous manner.

A first aspect concerns controlling the speed of a motor vehicle with an intelligent speed control system and a navigation system in a curve of a roadway, with the steps:
  Detecting the curve,
  Dividing the curve into at least two zones,
  Detecting the planned exit from the curve,
  Adjusting the speed of the motor vehicle depending on the zone to be reached,
  Accelerating the motor vehicle when a change of direction of the motor vehicle from the curve is detected.

The above steps advantageously allow automatic traversing of a curve, in which the speed is controlled depending on the current location and the intended turning direction.

The curve path is determined on the basis of map information stored in a memory device of the navigation system or available online (cloud). The curve path can also be based on GPS data, on-board environmental sensors and/or by means of an optical imaging device, for example a camera. Information obtained on the basis of vehicle-to-vehicle communication or vehicle-to-infrastructure communication can also be used to record the curve. The planned exit is determined on the basis of map information of the navigation system which determined the route to be driven.

The speed at which a curve is traversed depends on the part of the curve already driven through and the planned exit. The initial region of the curve, for example approximately in the first third of a roundabout, can be driven through at a higher speed than the other sections of the roundabout. Therefore, it is advantageous to divide the curve into zones.

Controlling the speed of the motor vehicle depending on the zone of the curve to be reached is advantageous because it is taken into account that different speeds are required in the zones. Lower speeds are possible for reaching more distant zones, for example if most of a roundabout is to be driven through, than if a nearby exit from the curve is chosen, for example in the first third of a roundabout. For this purpose, a target speed is calculated, with which the current speed is compared. If the current speed of the motor vehicle is too high, it is gradually reduced, if it is too low, it is gradually increased, and if it is as it should ideally be, it will not be changed. The speed is controlled by the IACC, i.e., it is adapted to the situation.

Furthermore, the speed of the vehicle can be controlled depending on the position of the motor vehicle in the curve. It is advantageous to know the position of the motor vehicle, since the speed of the motor vehicle can be controlled depending on the distance driven and the planned turn off.

The current position of the motor vehicle can be determined by comparing the known curve path with the driven distance. The curve path is taken from the map information of the navigation system. In this case, the percentage of the curve to be driven which has already been completed by the motor vehicle is calculated. For this purpose, the curve can be characterized by waypoints corresponding to a certain distance from the entrance to the curve and a certain curve shape (i.e. a certain curvature or a certain curvature value). In this way, reaching a point at which the apex of the curve to be driven begins and the speed is to be increased can be advantageously calculated.

A change in the direction control of the motor vehicle can be determined by means of sensors. It is advantageously recognized that the motor vehicle is starting to initiate a change of direction. This allows the motor vehicle to accelerate in time to exit the curve. Sensors for measuring the steering wheel angle and/or sensors for measuring the yaw rate are preferably used as the sensors, which measure the yaw rate and/or the steering wheel angle of the vehicle. This method is particularly advantageous compared to the use of GPS, because in a curve when the motor vehicle leaves the curve it can only be determined inaccurately by means of GPS data.

The present disclosure applies to, without limitation, situations in which the curve is a roundabout.

The roundabout can be divided into at least three zones with respect to the circular position of the planned exit of the motor vehicle from the roundabout. The speed to be driven can thus be advantageously adapted to the zone in which the planned exit is located. However, fewer or more zones are also possible if, for example, the size of the roundabout and/or the number and/or arrangement of the exits make this necessary. The number it can be used as a measure of the zone divisions, wherein a complete circle circumference is then referred to with 2 π.

A second aspect relates to a motor vehicle which has at least a navigation system and a control device, which is designed to control the vehicle as described herein. The advantages of the motor vehicle correspond to the advantages of the method according to the invention.

BRIEF SUMMARY OF THE DRAWINGS

The disclosure is explained in more detail on the basis of the figures. In the figures.

DESCRIPTION

Figure 1:
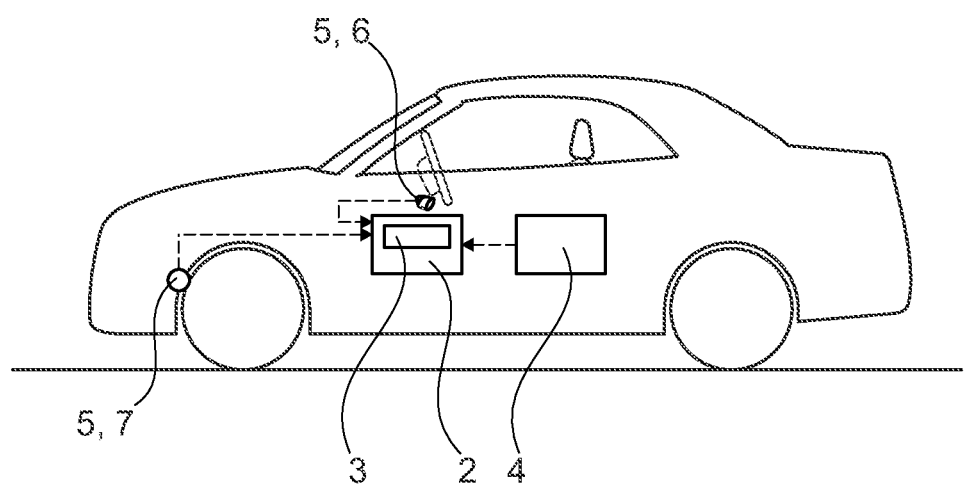
FIG. 1 shows a schematic representation of an embodiment of an example motor vehicle.

FIG. 1 shows an embodiment of an example motor vehicle 1. The motor vehicle 1 has a control device 2. An intelligent adaptive cruise control system (IACC) 3 is implemented in the control device 2. In the control device, an engine controller is also implemented, which, for example, controls the speed of an engine of the motor vehicle 1 in order to control the speed of the motor vehicle 1. The control device 2 is connected to a navigation device 4. Furthermore, the control device 2 is connected to two sensors 5, namely a steering wheel angle sensor 6 and a yaw rate sensor 7. The motor vehicle 1 may have further sensors 5 which transmit measured values to the control device 2.

Figure 2:
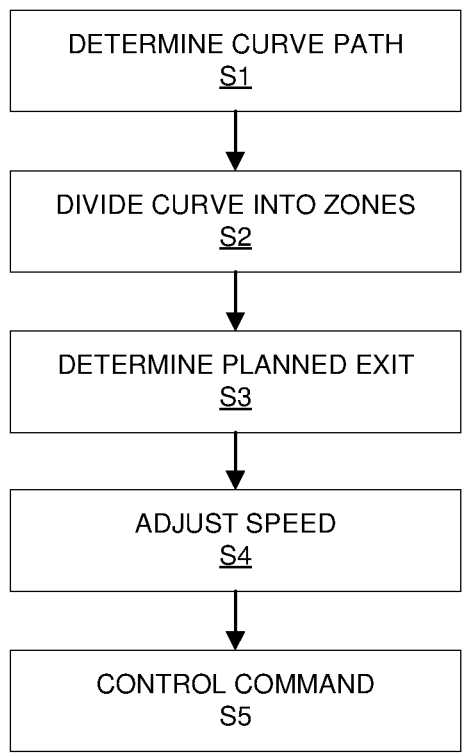
FIG. 2 shows a flow diagram of an embodiment of an example method.
Figure 3:
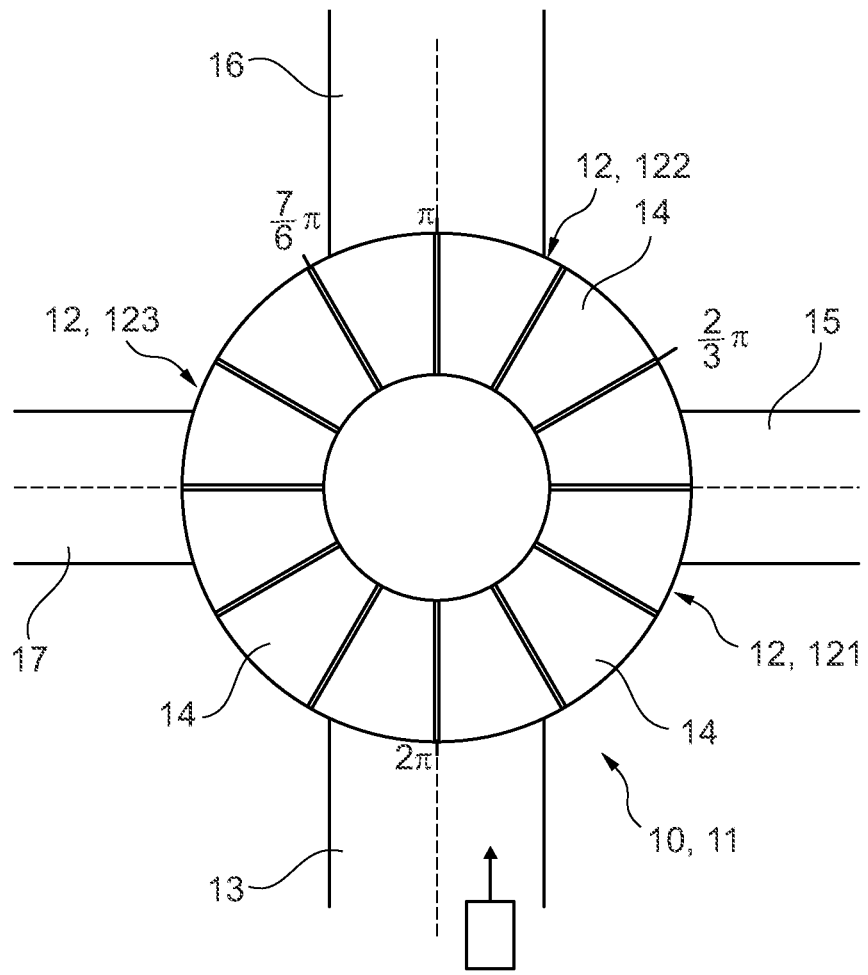
FIG. 3 shows a sketch of an example roundabout divided into zones.

In one example of a method according to the flow diagram of FIG. 2, a curve path 10 is determined in a first step S1. The curve path 10 is determined by the navigation device 4 and transmitted to the control device 2. The curve 10 here is a roundabout 11, as shown in FIG. 3. In a second step S2, the roundabout 11 is divided into zones 12 by the IACC 3. In this case the roundabout 11 is characterized by an entrance 13, several waypoints 14 of the curve along the perimeter of the roundabout 11 (characterized here by the subdivision of the zones 12) and three exits. The entrances and exits are situation-related. The number $\pi$ is used as the measure of the zoning, wherein a complete circumference is referred to as $2\pi$.

Figure 4A:
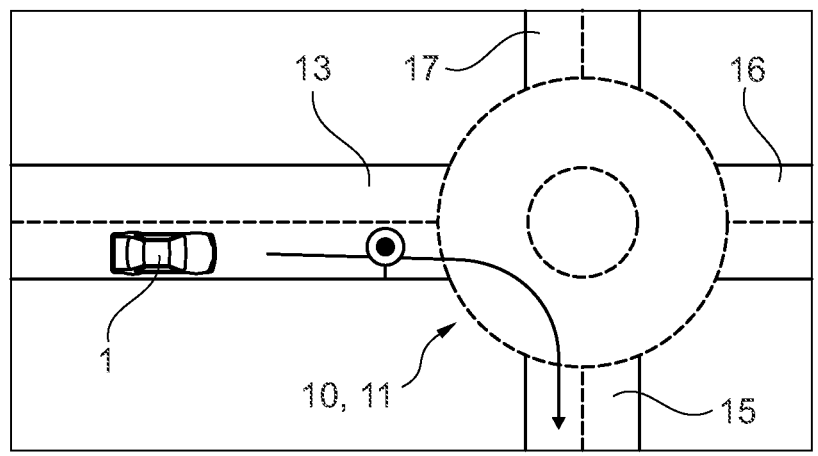
FIG. 4A shows a sketch of various a turning off, i.e., exit, situations in a roundabout.
Figure 4B:
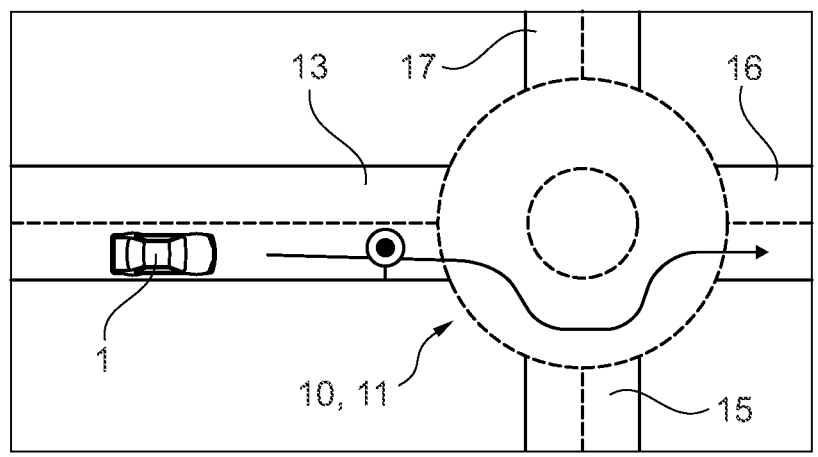
FIG. 4B shows a sketch of another turning off, i.e., exit, situation in a roundabout.
Figure 4C:
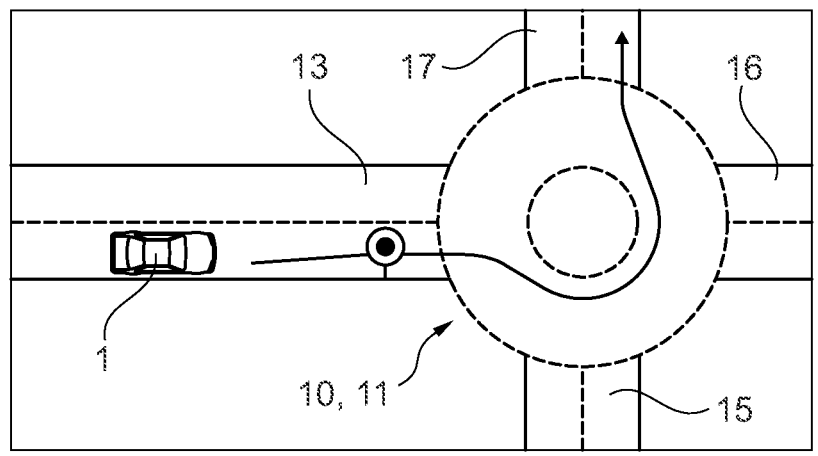
FIG. 4C shows a sketch of another turning off, i.e., exit, situation in a roundabout.

The motor vehicle 1 can select different exits from the roundabout 11. FIG. 4 shows a roundabout with different turning off situations. In FIG. 4A the motor vehicle 1 turns off into a first exit 15 from the roundabout 11, which is located at approximately an angle of 90° to the entrance. The first exit 15 is located in a first zone 121, which extends from the entrance 14 into the roundabout to about $2/3\pi$. In FIG. 4B, the motor vehicle 1 turns off into a second exit 16 from the roundabout 11, which is located at approximately an angle of 180° to the entrance. The second exit 16 is located in a second zone 122, which extends approximately from $2/3\pi$ to $7/6\pi$ within the scope of the roundabout 11. In FIG. 4C, the motor vehicle 1 turns off into a third exit 17 from the roundabout 11, which is located at approximately an angle of 270° to the entrance. The third exit 17 is located in a third zone 123, which extends approximately from $7/6\pi$ to the full circumference of the roundabout 11 ($2\pi$). The exit which is currently planned for the motor vehicle 1 is determined in step S3 on the basis of the route calculated by the navigation device 4.

In a fourth step S4, the speed of the motor vehicle 1 is adjusted accordingly. In the situation according to FIG. 4A a higher speed is possible than in the situation according to FIG. 4B, and in this case a higher speed is possible than in the situation 4C. The speed is continuously adapted to the current position of the vehicle 1. The distance travelled in the roundabout 11 and the orientation of the motor vehicle 1 in the roundabout 11 are used to determine the current position of the motor vehicle 1. Furthermore, reaching way points 14 of the roundabout 11 can be used to determine the position. A certain speed is set according to the current position and the exit to be reached (target speed $v_s$). If the current speed ($v_i$) is too low ($v_i < v_s$), the speed is increased. If the current speed is too high ($v_i > v_s$), the speed is reduced. If the current speed corresponds to the target speed ($v_i = v_s$), it is maintained.

The information about the speed conditions of the motor vehicle is communicated to the driver via a display. For example, it is stated that the speed $v_i$ is too low and that the motor vehicle 1 is being accelerated to the target speed $v_s$.

If an exit is reached at which the motor vehicle 1 is to drive out of the roundabout 11, a corresponding control command is issued for steering. The actual change in the position is recorded by the steering wheel angle sensor 6 and/or the yaw rate sensor 7, which send corresponding data to the control device 2. The control device 2 then issues a control command to increase the speed in a fifth step S5, so that the motor vehicle 1 accelerates out of the roundabout 11.

REFERENCE CHARACTER LIST

1 Motor vehicle
2 Control device
3 Intelligent speed assistance
4 Navigation device
5 Sensors
6 Steering wheel sensor
7 Yaw rate sensor
10 Curve or curve path
11 Roundabout
12 Zone
121 First zone
122 Second zone
123 Third zone
13 Entrance
14 Waypoints of the roundabout
15 First exit
16 Second exit
17 Third exit

The invention claimed is:

1. A method for controlling the speed of a motor vehicle with an intelligent speed control system and a navigation device in a curve of a roadway, the method comprising:
 detecting the curve;
 dividing the curve into at least three zones;
 detecting a planned exit from the curve;
 adjusting a speed of the motor vehicle depending on a zone to be reached; and
 accelerating the motor vehicle when a change of direction of the motor vehicle from the curve is detected.

2. The method of claim 1, wherein the speed of the motor vehicle is controlled depending on a position of the motor vehicle in the curve.

3. The method of claim 2, wherein the current position of the motor vehicle is determined by comparing the curve path known from the navigation device with a distance driven.

4. The method of claim 3, wherein the change in the direction of the motor vehicle is detected by sensors.

5. The method of claim 4, wherein sensors are used for at least one of measuring a steering wheel angle or for measuring a yaw rate to determine the change of direction.

6. The method of claim 5, wherein the curve is a roundabout.

7. The method of claim 6, wherein the roundabout is divided into at least four zones in relation to a planned exit of the motor vehicle from the roundabout.

8. The method of claim 1, wherein a path of the vehicle moves through one zone after the other as the vehicle moves forward along the curve.

9. A system, comprising a navigation device and a control device for a motor vehicle, the system configured to:
- detect a curve;
- divide the curve into at least three zones;
- detect a planned exit from the curve;
- adjust a speed of the motor vehicle depending on a zone to be reached; and
- accelerate the motor vehicle when a change of direction of the motor vehicle from the curve is detected.

10. The system of claim 9, wherein the speed of the motor vehicle is controlled depending on a position of the motor vehicle in the curve.

11. The system of claim 10, wherein the current position of the motor vehicle is determined by comparing the curve path known from the navigation device with a distance driven.

12. The system of claim 11, wherein the change in the direction of the motor vehicle is detected by sensors.

13. The system of claim 9, wherein sensors are used for at least one of measuring a steering wheel angle or for measuring a yaw rate to determine the change of direction.

14. The system of claim 13, wherein the curve is a roundabout.

15. The system of claim 14, wherein the roundabout is divided into at least four zones in relation to a planned exit of the motor vehicle from the roundabout.

16. The system of claim 9, wherein a path of the vehicle moves through one zone after the other as the vehicle moves forward along the curve.

\* \* \* \* \*